(12) United States Patent
Kumar et al.

(10) Patent No.: US 9,491,090 B1
(45) Date of Patent: Nov. 8, 2016

(54) METHODS AND APPARATUS FOR USING VIRTUAL LOCAL AREA NETWORKS IN A SWITCH FABRIC

(71) Applicant: Juniper Networks, Inc., Sunnyvale, CA (US)

(72) Inventors: Abhay Kumar, Chapra (IN); Pavan Kumar Tappal Ramakrishnaiah, San Jose, CA (US); Ravi Shekhar, Sunnyvale, CA (US); Amit Kumar Saha, Sunnyvale, CA (US); Easwar Swaminathan, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 251 days.

(21) Appl. No.: 13/722,094

(22) Filed: Dec. 20, 2012

(51) Int. Cl.
*H04L 12/761* (2013.01)
*H04L 12/46* (2006.01)

(52) U.S. Cl.
CPC .......... *H04L 45/16* (2013.01); *H04L 12/4645* (2013.01)

(58) Field of Classification Search
CPC .......... H04L 12/4649; H04L 12/4666; H04L 12/4641; H04L 12/4645
USPC .................... 370/230, 392, 395.53, 401, 474
See application file for complete search history.

(56) References Cited

U.S. PATENT DOCUMENTS

| 7,920,567 | B2 * | 4/2011 | Seto et al. | 370/392 |
| 8,681,641 | B1 * | 3/2014 | Sajassi et al. | 370/249 |
| 2003/0165140 | A1 * | 9/2003 | Tang et al. | 370/393 |
| 2005/0286537 | A1 * | 12/2005 | Shimada | 370/395.53 |
| 2007/0097968 | A1 * | 5/2007 | Du | 370/389 |
| 2009/0219817 | A1 * | 9/2009 | Carley | 370/235.1 |
| 2012/0278807 | A1 * | 11/2012 | Nakagawa | G06F 9/4856 718/1 |

OTHER PUBLICATIONS

IEEE 802.1ad. Wikipedia, Sep. 24, 2012 [retrieved on Oct. 23, 2012]. Retrieved from the Internet<URL: http://en.wikipedia.org/w/index.php?title=IEEE_802.1ad&oldid=514283593>.
IEEE 802.1Q-in-Q VLAN Tag Termination, Cisco IOS Release 12.2(33)XNE, Nov. 29, 2009. Retrieved from the Internet: <URL: http://www.cisco.com/c/en/us/td/docs/routers/10000/10008/feature/guides/qing.html>.

* cited by examiner

*Primary Examiner* — Redentor Pasia
(74) *Attorney, Agent, or Firm* — Cooley LLP

(57) ABSTRACT

In some embodiments, a switch module is configured to receive from a first edge device a multicast data unit having a VLAN identifier. The switch module is configured to select a set of port modules based on the VLAN identifier. The switch module is configured to define an unmodified instance of the multicast data unit for each port module from the set of port modules. The switch module is configured to send the unmodified instance of the multicast data unit to each port module from the set of port modules, such that each port module applies a filter to the received instance of the multicast data unit to restrict that received instance of the multicast data unit from being sent to a second edge device via that port module if the second edge device is associated with a VLAN domain different than a VLAN domain of the first edge device.

23 Claims, 7 Drawing Sheets

320

| VLAN ID 322 | Port ID 324 |
|---|---|
| 10 | hg0, hg1, hg2, hg3 |
| 20 | hg4, hg5, hg6 |
| . | . |
| . | . |
| . | . |

| Edge Device ID 342 | Domain ID 344 | Port ID 346 |
|---|---|---|
| TOR1 | 310 | hg0, hg1 |
| TOR2 | 310 | hg0, hg1 |
| TOR3 | 330 | hg2, hg3 |
| TOR4 | 330 | hg2, hg3 |
| TOR5 | 350 | hg4, hg5, hg6 |
| TOR6 | 350 | hg4, hg5, hg6 |
| TOR7 | 350 | hg4, hg5, hg6 |

FIG. 3C

VLAN Flood Table 453

| VLAN ID 41 | Port ID 42 | Port Bitmap 43 |
|---|---|---|
| 100 | 411, 412, 415 | 11001 |
| 200 | 413, 414 | 00110 |

FIG. 4B

Filter Table 454

| Edge Device ID 44 | Domain ID 45 | Port ID 46 | Port Bitmap 47 |
|---|---|---|---|
| 471, 472 | 441 | 411, 412 | 11000 |
| 481, 482, 491 | 443 | 413, 414, 415 | 00111 |

Receive, from a switch module, a first instance of a multicast data unit defined based on a second instance of the multicast data unit being received at the switch module and from a first edge device associated with a VLAN identifier, the first instance of the multicast data unit including an identifier of the first edge device.
502

Select, based on the identifier of the first edge device, a filter rule from a filter database, the filter rule associating the identifier of the first edge device with a set of ports associated with a VLAN domain of the first edge device different from the VLAN of the first edge device.
504

Send the first instance of the multicast data unit to a second edge device associated with the VLAN identifier if, according to the filter rule, the second edge device is operatively coupled to the switch module via a port from the set of ports.
506

FIG. 5

METHODS AND APPARATUS FOR USING VIRTUAL LOCAL AREA NETWORKS IN A SWITCH FABRIC

BACKGROUND

Some embodiments described herein relate generally to switch fabric systems, and, in particular, to methods and apparatus for using virtual local area networks (VLANs) in a switch fabric.

Some known switch fabric systems support multiple VLANs by adopting an existing standard that assigns a certain number of bits in a data unit header to specify a VLAN identifier. For example, according to the IEEE 802.1Q standard, 12 bits in the Ethernet header of a data unit are assigned to specify a VLAN identifier. The maximum number of VLANs that can be supported by such a known switch fabric system containing multiple switches, however, is the same number that a single switch can support. Thus, the availability of VLANs does not scale with the size of the switch fabric system. Some other known switch fabric systems support more VLANs by using more bits in the data unit header than defined in the existing standard to specify more VLAN identifiers. Such a method, however, is typically impractical because it changes the existing standard that is heavily in use for switch fabric systems.

Accordingly, a need exists for methods and apparatus that can increase the number of VLANs supported by a switch fabric system without changing any existing standard.

SUMMARY

In some embodiments, a switch module is configured to receive from a first edge device a multicast data unit having a VLAN identifier. The switch module is configured to select a set of port modules based on the VLAN identifier. The switch module is configured to define an unmodified instance of the multicast data unit for each port module from the set of port modules. The switch module is configured to send the unmodified instance of the multicast data unit to each port module from the set of port modules, such that each port module applies a filter to the received instance of the multicast data unit to restrict that received instance of the multicast data unit from being sent to a second edge device via that port module if the second edge device is associated with a VLAN domain different than a VLAN domain of the first edge device.

BRIEF DESCRIPTION OF THE DRAWINGS

FIG. 3B is a schematic illustration of a VLAN flood table used in the switch fabric of FIG. 3A for forwarding data.

FIG. 3C is a schematic illustration of a filter table used in the switch fabric of FIG. 3A for forwarding data.

FIG. 4B is a schematic illustration of a VLAN flood table used in the switch device of FIG. 4A for forwarding data.

FIG. 4C is a schematic illustration of a filter table used in the switch device of FIG. 4A for forwarding data.

FIG. 5 is a flow chart that illustrates a method for forwarding data among edge devices associated with a common VLAN domain, according to an embodiment.

DETAILED DESCRIPTION

Figure 1:
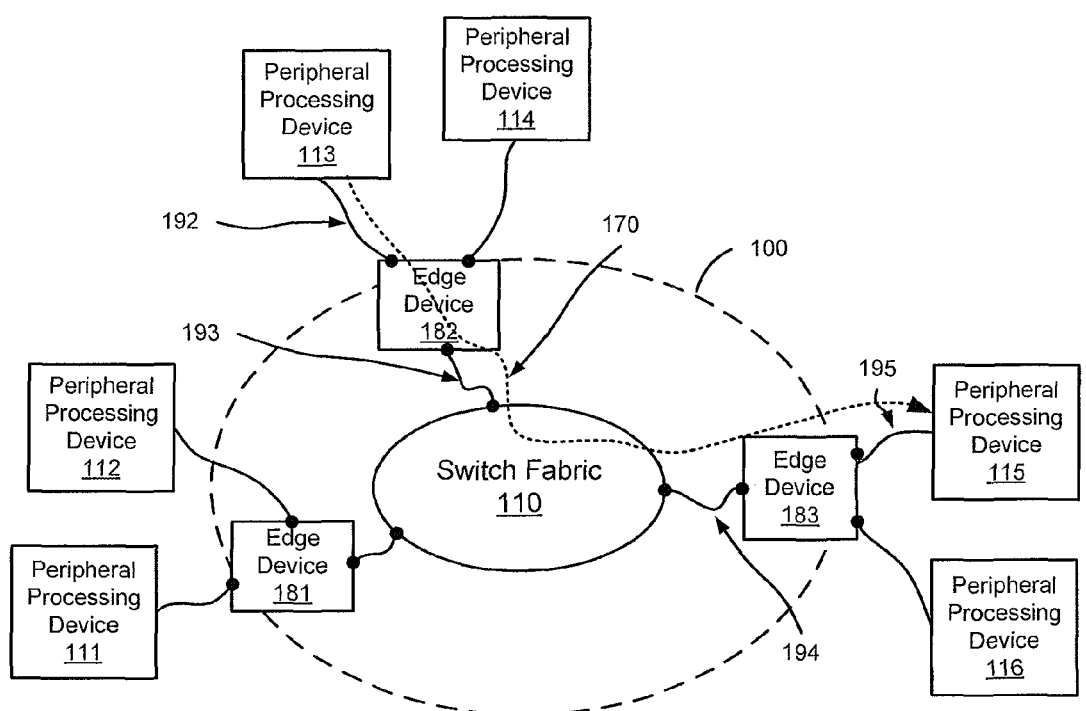
FIG. 1 is a schematic illustration of a switch fabric system configured to forward data, according to an embodiment.

In some embodiments, an apparatus includes a switch module implemented in at least one of a memory or a processing device. The switch module is operatively coupled to a first edge device. The switch module is configured to receive from the first edge device a multicast data unit having a VLAN identifier. The switch module is configured to select, based on the VLAN identifier, a set of port modules associated with the VLAN identifier. In some instances, the switch module can be configured to select the set of port modules using a VLAN flood table. The switch module is then configured to define an unmodified instance of the multicast data unit for each port module from the set of port modules.

The switch module is further configured to send the unmodified instance of the multicast data unit to each associated port module from the set of port modules. In response to receiving the instance of the multicast data unit, each port module from the set of port modules applies a filter to the instance of the multicast data unit. As a result of applying the filter, each port module from the set of port modules restricts that instance of the multicast data unit from being sent to a second edge device operatively coupled to the switch module via that port module if the second edge device is associated with a VLAN domain different than a VLAN domain of the first edge device.

In some instances, each of the multicast data unit and its unmodified instances includes an identifier of the first edge device. The switch module is configured to send the unmodified instance of the multicast data unit to each port module from the set of port modules associated with the VLAN identifier such that each port module from the set of port modules applies the filter based on the identifier of the first edge device. In some instances, the switch module can be implemented at an ingress stage of a multistage switch and each port module from the set of port modules can be implemented at an egress stage of the multistage switch. In some instances, the switch module can be physically collocated with each port module from the set of port modules. In other instances, the switch module can be implemented at a first device different than a second device implementing at least one port module from the set of port modules.

In some embodiments, an apparatus includes a port module implemented in at least one of a memory or a processing device. The port module operatively couples a first edge device to a switch module. The port module is configured to receive, from the switch module and based on the first edge device being associated with a VLAN identifier, a first instance of a multicast data unit, where the first instance of the multicast data unit is defined based on a second instance of the multicast data unit that is received at the switch module from a second edge device and has an identifier of the second edge device. In some instances, the first instance of the multicast data unit can be an unmodified copy of the second instance of the multicast data unit.

The port module is then configured to select a filter rule from a filter database based on the identifier of the second edge device in the first instance of the multicast data unit. The port module is further configured to apply the filter rule to the first instance of the multicast data unit to produce a filter result, and send the first instance of the multicast data unit to the first edge device if the filter result indicates that the first edge device is associated with a VLAN domain associated with the second edge device.

In some instances, the filter result can be a result of a bitwise logical AND of a port bitmap associated with the VLAN identifier and a bitmap associated with the VLAN domain of the second edge device. In some instances, the filter database can associate the identifier of the second edge device with a set of ports associated with the VLAN domain of the second edge device. In some instances, the VLAN identifier can be associated with a set of edge devices including the first edge device and the second edge device, and the VLAN domain can include a subset of the set of edge devices.

As used herein, a switch module that is within a switch fabric can be, for example, any assembly and/or set of operatively-coupled electrical components that define one or more switches within a stage of a switch fabric. In some embodiments, a switch module can include, for example, a memory, a processor, electrical traces, optical connectors, software (executing in hardware) and/or the like.

As used herein, a multicast data unit can be any data unit addressed to be sent to two or more destination devices. For example, a multicast data unit can be a multicast frame, a multicast packet, a broadcast frame, a broadcast packet and/or the like.

As used herein, a VLAN domain can be a group of VLANs having different VLAN identifiers. Specifically, each VLAN included in a VLAN domain is assigned a unique VLAN identifier that is different than the VLAN identifier of each other VLAN included in the same VLAN domain. On the other hand, a VLAN included in a VLAN domain can have the same VLAN identifier as a VLAN included in another VLAN domain. That is, VLAN identifier is unique to a VLAN within its VLAN domain, but not necessarily unique to VLANs across multiple VLAN domains.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the "third stage" (the third and final stage with respect to the ingress to egress direction). For example, FIG. 2 (discussed below) refers to specific stages within a given multi-stage switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the first stage within the three-stage Clos network). Thus, it should be understood that the specific context will indicate whether the terms "first stage", "second stage" and so on can refer to a specific ordinal stage within a switch fabric or can refer to any particular stage within the switch fabric.

As used in this specification, the singular forms "a," "an" and "the" include plural referents unless the context clearly dictates otherwise. Thus, for example, the term "a switch device" is intended to mean a single device with switching capabilities (e.g., configured to switch data units) or a combination of devices with switching capabilities.

FIG. 1 is a schematic illustration of a switch fabric system 100 configured to forward data such as multicast and/or broadcast data, according to an embodiment. The switch fabric system 100 includes a switch fabric 110 and multiple edge devices (e.g., edge devices 181-183). The switch fabric system 100 operatively couples multiple peripheral processing devices (e.g., peripheral processing devices 111-116) to each other. Specifically, the edge device 181 is operatively coupled to the peripheral processing devices 111 and 112; the edge device 182 is operatively coupled to the peripheral processing devices 113 and 114; and the edge device 183 is operatively coupled to the peripheral processing devices 115 and 116. Although not shown in FIG. 1, the switch fabric system 100 can include any number of edge devices and operatively couple any number of peripheral processing devices to each other.

The peripheral processing devices 111-116 can be any device that can be operatively coupled to and communicate with (e.g., transmit data units to and/or receive data units from) the switch fabric system 100 such as, for example, compute nodes, service nodes, routers, storage nodes, etc. In some embodiments, for example, the peripheral processing devices 111-116 include servers, storage devices, gateways, workstations, and/or the like.

The peripheral processing devices 111-116 can be operatively coupled to the edge devices 181-183 of the switch fabric system 100 using any suitable connection such as, for example, an optical connection (e.g., an optical cable and optical connectors), an electrical connection (e.g., an electrical cable and electrical connectors), a wireless connection (e.g., a wireless link and wireless signal transceivers) and/or the like. As such, the peripheral processing devices 111-116 are configured to send data (e.g., data packets) to the switch fabric system 100 via the edge devices 181-183. In some embodiments, the connection between a peripheral processing device (e.g., the peripheral processing devices 111-116) and an edge device (e.g., the edge devices 181-183) can be a direct link. Such a link can be said to be a single physical hop link. In other embodiments, although not shown in FIG. 1, a peripheral processing device can be operatively coupled to an edge device via intermediate modules. Such a connection can be said to be a multiple physical hop link.

Each edge device 181, 182, 183 can be any device configured to operatively couple peripheral processing devices 111-116 to the switch fabric 110. In some embodiments, for example, the edge devices 181-183 can be access switches, input/output modules, top-of-rack devices (TOR), and/or the like. Structurally, the edge devices 181-183 can function as both source edge devices and destination edge devices. Accordingly, the edge devices 181-183 can send data (e.g., data packets, data cells, data units) to and receive data from the switch fabric 110, and to and from the connected peripheral processing devices 111-116.

In some embodiments, the edge devices 181-183 can be a combination of hardware modules and software modules (stored in memory and/or executing in hardware). In some embodiments, for example, each edge device 181, 182, 183 can include a field-programmable gate array (FPGA), an application specific integrated circuit (ASIC), a digital signal processor (DSP), and/or the like.

Each of the edge devices 181-183 is configured to communicate with the other edge devices 181-183 via the switch fabric 110. Specifically, the switch fabric 110 is configured to provide any-to-any connectivity between the edge devices 181-183 at relatively low latency. For example, the switch fabric 110 can be configured to transmit (e.g., convey) data between edge devices 181-183. In some embodiments, the switch fabric 110 can have at least hundreds or thousands of ports (e.g., egress ports and/or ingress ports) through which the edge devices 181-183 can transmit and/or receive data. As shown and described in further detail below with respect to FIG. 2, each edge device 181, 182, 183 can be configured to communicate with the other edge devices 181, 182, 183 over multiple data paths. More specifically, in some embodiments, multiple data paths exist, within the switch fabric 110, between a first edge device and a second edge device.

The edge devices 181-183 can include one or more network interface devices (e.g., a 40 Gigabit (Gb) Ethernet interface, a 100 Gb Ethernet interface, etc.) through which the edge devices 181-183 can send signals to and/or receive signals from the switch fabric 110. The signals can be sent to and/or received from the switch fabric 110 via an electrical link, an optical link and/or a wireless link operatively coupled to the edge devices 181-183. In some embodiments, the edge devices 181-183 can be configured to send signals to and/or receive signals from the switch fabric 110 based on one or more protocols (e.g., an Ethernet protocol, a multi-protocol label switching (MPLS) protocol, a Fibre Channel (FC) protocol, a Fibre-Channel-over Ethernet (FCoE) protocol, an Infiniband-related protocol, a cell-based protocol, etc.).

The switch fabric 110 can be any suitable switch fabric that operatively couples the edge devices 181-183 to the other edge devices 181-183 via multiple data paths. In some embodiments, for example, the switch fabric 110 can be a fabric interconnect (IC), a Clos network (e.g., a non-blocking Clos network, a strict sense non-blocking Clos network, a Benes network) having multiple stages of switch modules (e.g., integrated Ethernet switches). In some embodiments, for example, the switch fabric 110 can be similar to the switch fabric 200 shown in FIG. 2 and described in further detail herein, which has three stages. In other embodiments, the switch fabric 110 can include any number of stages. In such embodiments, for example, the switch fabric 110 can include five, seven or nine stages. The switch fabric 110 can be, for example, similar to the switch fabric described in U.S. patent application Ser. No. 13/433,960, filed Mar. 29, 2012, and entitled "Methods and Apparatus for Randomly Distributing Traffic in a Multi-Path Switch Fabric," which is incorporated herein by reference in its entirety.

In some embodiments, the switch fabric 110 can be (e.g., can function as) a single consolidated switch (e.g., a single large-scale consolidated L2/L3 switch). In other words, the switch fabric 110 can be configured to operate as a single logical entity (e.g., a single logical network element). In some embodiments, although the switch fabric 110 can be logically centralized, the implementation of the switch fabric 110 can be highly distributed, for example, for reliability. For example, portions of the switch fabric 110 can be physically distributed across, for example, many chassis. In some embodiments, for example, a stage of the switch fabric 110 can be included in a first chassis and another stage of the switch fabric 110 can be included in a second chassis. Both of the stages can logically function as part of a single consolidated switch but have a separate single physical hop between respective pairs of stages. More details related to architecture of a switch fabric are described herein with respect to FIG. 2.

In use, a data unit (e.g., a data packet, a data cell, a data frame) can be sent between the peripheral processing devices 111-116 via portions of the switch fabric system 100. For example, as shown in FIG. 1, a data packet can be sent from the peripheral processing device 113 to the peripheral processing device 115 via path 170. The peripheral processing device 113 can send the data packet to the edge device 182 via link 192. The edge device 182 can then prepare the data packet to enter the switch fabric 110 by disassembling the data packet into multiple data cells, which are then sent by the edge device 182 to the switch fabric 110 via link 193. The switch modules within the switch fabric 110 can route the data cells through the switch fabric 110 via one or more of the multiple paths within the switch fabric 110. The data cells are sent to the edge device 183 via link 194. The edge device 183 can reassemble the data cells into a data packet that is identical (or substantially identical) to the original data packet and then send the data packet to the peripheral processing device 115 via link 195.

In some embodiments, the switch fabric system 100 can be configured to support multiple Virtual Local Area Networks (VLANs). In such embodiments, an edge device (e.g., the edge devices 181-183) and its associated peripheral processing device(s) (i.e., the peripheral processing device(s) that is coupled to the switch fabric 110 by that edge device) can be included in a VLAN. For example, the edge device 181 and the peripheral processing devices 111 and 112 can be included in a first VLAN; and the edge devices 182, 183 and the peripheral processing devices 113, 114, 115, 116 can be included in a second VLAN different from the first VLAN. Furthermore, the switch fabric system 100 can be configured to distribute multicast data units (e.g., multicast data packets, broadcast data packets, and/or any other data unit addressed to two or more devices) from a peripheral processing device included in a VLAN to all or a portion of the remaining peripheral processing device(s) included in the same VLAN. Details of sending multicast data units within a VLAN are described with respect to FIGS. 3A-5.

Figure 2:
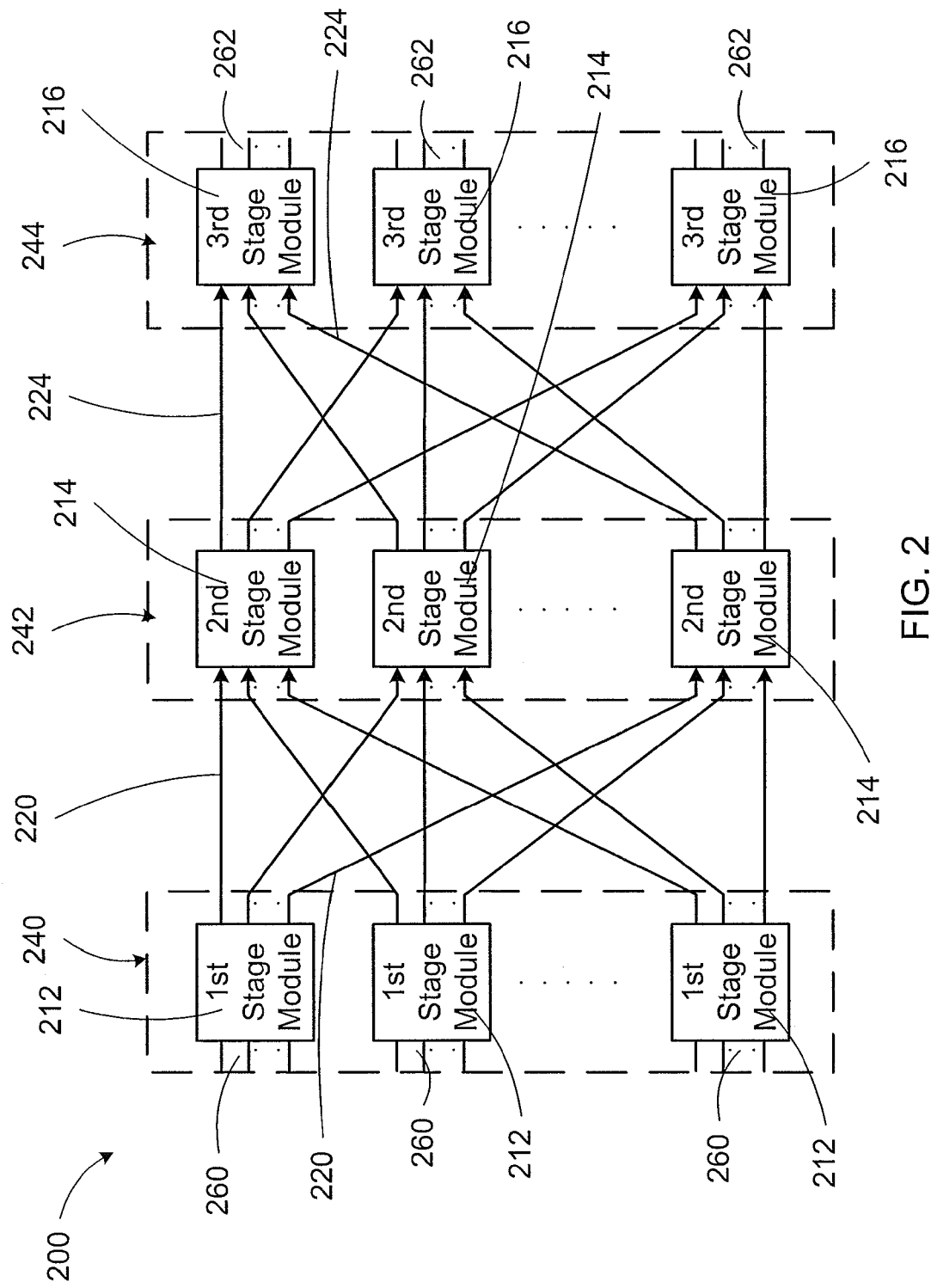
FIG. 2 is a schematic illustration of a multi-stage switch fabric, according to an embodiment.

FIG. 2 is a schematic illustration of a multi-stage switch fabric 200, according to an embodiment. The switch fabric 200 can include multiple physical hops that are within a single logical hop. In some embodiments, the switch fabric 200 can be a multi-stage, non-blocking Clos network that includes a first stage 240, a second stage 242, and a third stage 244. The first stage 240 includes switch modules 212; the second stage 242 includes switch modules 214; the third stage 244 includes switch modules 216. Said another way, the switch modules 212 of the first stage 240, the switch modules 214 of the second stage 242 and the switch modules 216 of the third stage 244 collectively define the multi-stage switch fabric 200.

In the switch fabric 200, each switch module 212, 214 or 216 can be an assembly of electronic components and circuitry. In some embodiments, for example, a switch module (e.g., a switch module 212, 214, 216) can be an ASIC. In other embodiments, multiple switch modules can be contained on a single ASIC or a single chip package. In still other embodiments, a switch module can be an assembly of discrete electrical components.

In some embodiments, a switch module in the switch fabric 200 can be a switch such as, for example, a packet switch, a frame switch, an integrated Ethernet switch, a cell switch, and/or the like. Such switches can be configured to redirect data (e.g., data units, data packets, data cells, data frames, etc.) as it flows through the switch fabric 200. In some embodiments, a switch can include multiple ingress ports operatively coupled to write interfaces on a memory buffer (not shown in FIG. 2). Similarly, a set of egress ports are operatively coupled to read interfaces on the memory buffer. In some embodiments, the memory buffer can be a shared memory buffer implemented using on-chip static random access memory (SRAM) to provide sufficient bandwidth for all ingress ports to write one incoming data cell (e.g., a portion of a data packet) or data packet per time period (e.g., one or more clock cycles) and for all egress ports to read one outgoing data cell or data packet per time period. A switch can operate similarly to a crossbar switch that can be reconfigured in subsequent each time period.

As shown in FIG. 2, each switch module 212 of the first stage 240 includes a set of ingress ports 260 configured to receive data (e.g., a data cell) as it enters the switch fabric 200. For example, each ingress port 260 can be coupled to an edge device (e.g., the edge devices 181, 182, 183 shown and described with respect to FIG. 1). In some embodiments, more than one ingress port 260 of a switch module 212 can be coupled to different ports of a common edge device via separate physical connections (e.g., multiple electrical cables, multiple fiber-optic cables, etc.). Accordingly, an edge device can send data to the switch fabric 200 via the multiple ingress ports 260 of that switch module 212. In the embodiment shown in FIG. 2, each switch module 212 of the first stage 240 includes the same number of ingress ports 260.

Similar to the first stage 240, the second stage 242 of the switch fabric 200 includes switch modules 214. The switch modules 214 of the second stage 242 are structurally similar to the switch modules 212 of the first stage 240. Each switch module 214 of the second stage 242 is operatively coupled to each switch module 212 of the first stage 240 by a data path 220. Each data path 220 between a given switch module 212 of the first stage 240 and a given switch module 214 of the second stage 242 is configured to facilitate data transfer from the switch modules 212 of the first stage 240 to the switch modules 214 of the second stage 242.

The data paths 220 between the switch modules 212 of the first stage 240 and the switch modules 214 of the second stage 242 can be constructed in any manner configured to facilitate data transfer from the switch modules 212 of the first stage 240 to the switch modules 214 of the second stage 242. In some embodiments, for example, the data paths 220 can be optical connectors between the switch modules. In other embodiments, the data paths 220 can be within a midplane. Such a midplane can be used to connect each switch module 214 of the second stage 242 with each switch module 212 of the first stage 240. In still other embodiments, a switch module 212 and a switch module 214 can be contained within a single chip package and the data paths 220 can be electrical traces.

In some embodiments, the switch fabric 200 can be a non-blocking Clos network. Thus, the number of switch modules 214 of the second stage 242 of the switch fabric 200 varies based on the number of ingress ports 260 of each switch module 212 of the first stage 240. In a rearrangeably non-blocking Clos network (e.g., a Benes network), the number of switch modules 214 of the second stage 242 is greater than or equal to the number of ingress ports 260 of each switch module 212 of the first stage 240. In some embodiments, for example, each switch module 212 of the first stage 240 has five ingress ports. Thus, the second stage 242 has at least five switch modules 214. Each of the switch modules 212 of the first stage 240 is operatively coupled to all the switch modules 214 of the second stage 242 by data paths 220. Said another way, each switch module 212 of the first stage 240 can send data to any switch module 214 of the second stage 242.

The third stage 244 of the switch fabric 200 includes switch modules 216. The switch modules 216 of the third stage 244 are structurally similar to the switch modules 212 of the first stage 240 and the switch modules 214 of the second state 242. The number of switch modules 216 of the third stage 244 is typically equivalent to the number of switch modules 212 of the first stage 240. Each switch module 216 of the third stage 244 includes egress ports 262 configured to allow data to exit the switch fabric 200. For example, each egress port 262 can be coupled to an edge device (e.g., the edge devices 181, 182, 183 shown and described with respect to FIG. 1). In some embodiments, similar to the switch module 212 of the first stage 240, more than one egress port 262 of a switch module 216 can be coupled to different ports of a common edge device via separate physical connections (e.g., multiple electrical cables, multiple fiber-optic cables, etc.). Accordingly, the edge device can receive data from the switch fabric 200 via the multiple egress ports 262. In the embodiment shown in FIG. 2, each switch module 216 of the third stage 244 includes the same number of egress ports 262. Further, the number of egress ports 262 of each switch module 216 of the third stage 244 is typically equivalent to the number of ingress ports 260 of each switch module 212 of the first stage 240.

Each switch module 216 of the third stage 244 is connected to each switch module 214 of the second stage 242 by a data path 224. The data paths 224 between the switch modules 214 of the second stage 242 and the switch modules 216 of the third stage 244 are configured to facilitate data transfer from the switch modules 214 of the second stage 242 to the switch modules 216 of the third stage 244.

Similar to the data paths 220, the data paths 224 between the switch modules 214 of the second stage 242 and the switch modules 216 of the third stage 244 can be constructed in any manner configured to facilitate data transfer from the switch modules 214 of the second stage 242 to the switch modules 216 of the third stage 244. In some embodiments, for example, the data paths 224 can be optical connectors between the switch modules. In other embodiments, the data paths 224 can be within a midplane. Such a midplane can be used to connect each switch module 214 of the second stage 242 with each switch module 216 of the third stage 244. In still other embodiments, a switch module 214 and a switch module 216 can be contained within a single chip package and the data paths 224 can be electrical traces.

In some embodiments, data can be routed through the switch fabric 200 using hash functions, lookup tables, routing tables and/or the like. For example, a first stage switch module 212 can determine to which second stage switch module 214 to send a data cell by using header values of the data cell as inputs to a hash function. A result of the hash function can be an identifier of a second stage switch module 214 and the first stage switch module 212 can send the data cell accordingly. Similarly, a second stage switch module 214 and/or a third stage switch module 216 can determine to which third stage switch module 216 or to which edge device (i.e., coupled to an egress port 262), respectively, to send the data cell, respectively, using such a hash function, a lookup table and/or a routing table.

Figure 3A:
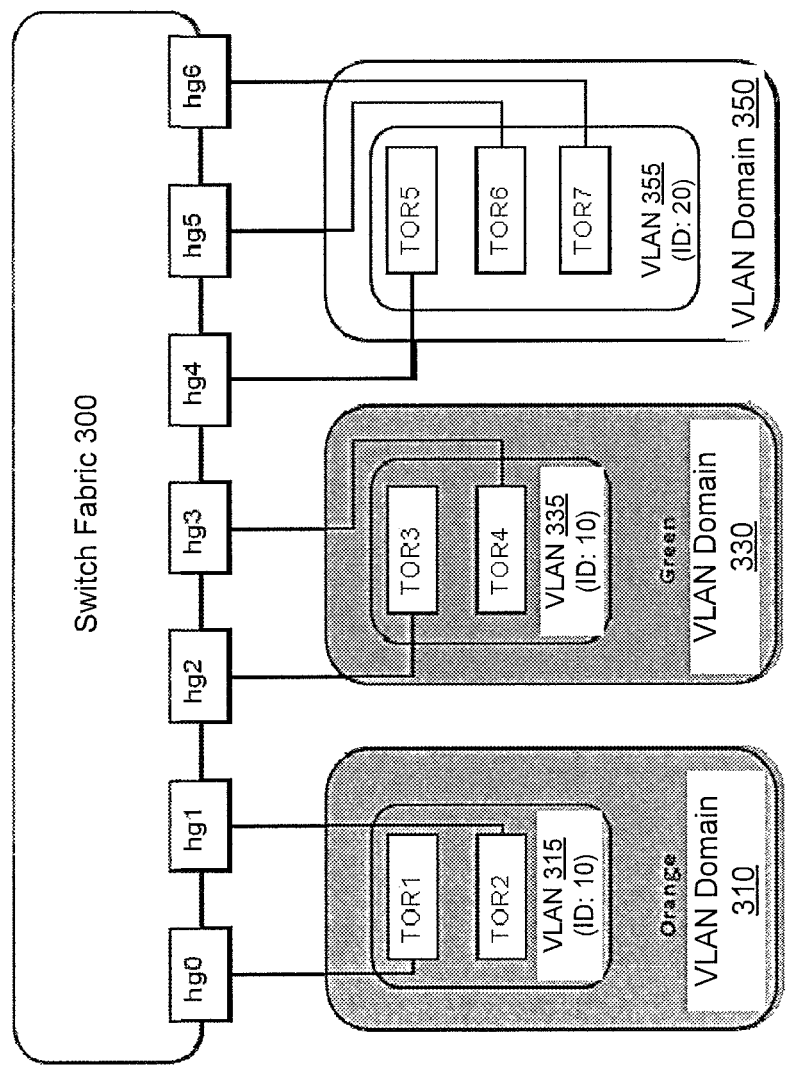
FIG. 3A is a schematic illustration of a switch fabric configured to forward data for multiple VLANs associated with multiple VLAN domains, according to an embodiment.

FIG. 3A is a schematic illustration of a switch fabric 300 configured to forward data for multiple VLANs (e.g., VLANs 315, 335, 355) associated with multiple VLAN domains (e.g., VLAN domains 310, 330, 350), according to an embodiment. The switch fabric 300 can be structurally and functionally similar to the switch fabric 110 and the switch fabric 200 shown and described with respect to FIGS. 1 and 2. Particularly, although not shown in FIG. 3A, the switch fabric 300 can include multi-stage switches similar to the switch modules 212, 214, 216 in FIG. 2. Similar to the switch module 212 and 216, a switch at an ingress stage or an egress stage of the multi-stage within the switch fabric 300 can have one or more ports (e.g., ports hg0-hg6 in FIG. 3A), through which the switch fabric 300 can receive data from and/or send data to edge devices (e.g., edge devices TOR1-TOR7) connected to the switch fabric 300 via those ports.

In some embodiments, depending on the direction of data transmission, a switch functioning as an ingress stage switch associated with a data stream (that is, data units from that data stream are received from an edge device at the switch) can function as an egress stage switch associated with another data stream (that is, data units from the other data stream are sent from the switch to an edge device). In some embodiments, an ingress stage switch can be referred to as a switch module and an egress stage switch can be referred to as a port module. Thus, a switch within the switch fabric 300 can function both as a switch module for a data stream and as a port module for a different data stream. Similarly, a port (e.g., port hg0-hg6) of that switch can function both as an ingress port and an egress port of the switch fabric 300.

Ports hg0-hg6 can be part of one or more communication interfaces and/or network interfaces (e.g., a 40 Gigabit (Gb) Ethernet interface, a 100 Gb Ethernet interface), through which a switch of the switch fabric 300 can send data to and/or receive data from external devices (e.g., an edge device such as TOR1-TOR7) operatively coupled to the switch fabric 300 via those interfaces. As shown in FIG. 3A, the ports hg0-hg6 are operatively coupled to the edge devices TOR1-TOR7, respectively. Each port hg0-hg6 is a communication port of an ingress/egress stage switch of the switch fabric 300. For example, the ports hg0 and hg1 can be within a first switch; the ports hg2, hg4 and hg5 can be within a second switch; and the ports hg3 and hg6 can be within a third switch. Thus, each port hg0-hg6 can be configured to operatively couple the corresponding edge device (e.g., TOR1-TOR7) to the switch hosting that port, and enable data transmission between the switch and the corresponding edge device.

The edge devices TOR1-TOR7 that communicate with the switch fabric 300 via the ports hg0-hg6 can be structurally and functionally similar to the edge devices 181-183 shown and described with respect to FIG. 1. Particularly, the edge devices TOR1-TOR7 can be operatively coupled to the corresponding ports hg0-hg6 using any suitable connection such as, for example, an optical connection (e.g., an optical cable and optical connectors), an electrical connection (e.g., an electrical cable and electrical connectors), a wireless connection (e.g., a wireless link and wireless signal transceivers), and/or the like. Similarly stated, in some embodiments, the ports hg0-hg6 can implement a physical layer using twisted-pair electrical signaling via electrical cables, or fiber-optic signaling via fiber-optic cables, or wireless signaling via a wireless link between two wireless signal transceivers, etc. In some embodiments, some of the ports hg0-hg6 can implement one physical layer such as twisted-pair electrical signaling and others of the ports hg0-hg6 can implement a different physical layer such as fiber-optic signaling.

Furthermore, the ports hg0-hg6 can allow the switch fabric 300 to communicate with the edge devices TOR1-TOR7 via one or more communication protocols such as, for example, an Ethernet protocol, a MPLS protocol, a FC protocol, an FCoE protocol, an Infiniband-related protocol, a cell-based protocol, etc. In some embodiments, some of the ports hg0-hg6 can implement one protocol such as Ethernet and others of the ports hg0-hg6 can implement a different protocol such as Fibre Channel. Thus, the switch fabric 300 can be in communication with the edge devices TOR1-TOR7 using homogeneous or heterogeneous physical layers and/or protocols via the ports hg0-hg6.

Similar to the edge device 181-183 in FIG. 1, each edge device TOR1-TOR7 and its associated peripheral processing device(s) (not shown in FIG. 3A) can be included in a VLAN. As shown in FIG. 3A, the edge devices TOR1 and TOR2 are included in VLAN 315; the edge devices TOR3 and TOR4 are included in VLAN 335; and the edge devices TOR5, TOR6 and TOR7 are included in VLAN 355. Although not shown in FIG. 3A, in some embodiments, the switch fabric 300 can have more or less ports similar to the ports hg0-hg6, each of which can be coupled to an edge device similar to the edge devices TOR1-TOR7.

In some embodiments, each VLAN operatively coupled to the switch fabric 300 can be identified by a VLAN identifier. A data unit associated with a VLAN (e.g., a multicast data unit sent from a device included in a VLAN) can be identified by including the associated VLAN identifier in a header of the data unit. For example, according to the IEEE 802.1Q standard, 12 bits in the Ethernet header of a data unit associated with a VLAN are assigned to specify the VLAN identifier of that VLAN. In some other embodiments, more or less bits in a header of a data unit can be assigned to specify a VLAN identifier according to another standard or protocol that defines data transmission for VLANs.

In some embodiments, a VLAN can be included in a VLAN domain, which can be used to group multiple VLANs with a common characteristic together. For example, VLANs associated with a common entity (e.g., an organization, company, institute, etc.) can be included in a VLAN domain of that entity. Furthermore, each VLAN included in a VLAN domain is assigned a unique VLAN identifier that is different than the VLAN identifier of each other VLAN included in the same VLAN domain. On the other hand, a VLAN included in a VLAN domain can have the same VLAN identifier as a VLAN included in another VLAN domain. That is, VLAN identifier is unique to a VLAN within its VLAN domain, but not necessarily unique to VLANs across multiple VLAN domains.

In the example of FIG. 3A, VLAN 315 is included in the VLAN domain 310 and has a VLAN identifier 10; VLAN 335 is included in the VLAN domain 330 and has a VLAN identifier 10, which is identical to the VLAN identifier for the VLAN 315; VLAN 355 is included in the VLAN domain 350 and has a VLAN identifier 20. Each VLAN domain 310, 330, 350 can be associated with a different entity such as, for example, a different organization, company, institute, etc. Each VLAN within the VLAN domain 310, 330, 350 can be associated with a specific group of devices that share a common characteristic. For example, the VLAN 315 included in the VLAN domain 310 can be a virtual network of computers assigned to faculty members of a university. For another example, the VLAN 335 of the VLAN domain 330 can be a virtual network of devices associated with a department of an international company.

In some embodiments, a peripheral processing device (e.g., a computer, a server, a workstation, etc.) within a VLAN can send a multicast data unit that is intended to be delivered to each other peripheral processing device within the same VLAN. In such embodiments, a source edge device that connects that peripheral processing device to the switch fabric 300 can send the multicast data unit to the switch fabric, where one or more instances of the multicast data unit can be defined and then sent to one or more destination edge devices that connect the remaining peripheral processing device(s) of the VLAN to the switch fabric 300. Thus, the instance(s) of the multicast data unit can be delivered to each of the remaining peripheral processing device(s) within the VLAN.

Specifically, the source edge device can send a multicast data unit, which is received from a peripheral processing device, to an ingress stage switch (e.g., a switch module) via a port of that ingress stage switch that connects the source edge device to the switch fabric 300. The multicast data unit sent from the source edge device includes the VLAN identifier associated with the source edge device and an identifier of the source edge device (e.g., in a header of the multicast data unit). For example, the edge device TOR1 can send a multicast data unit, via the port hg0, to an ingress stage switch (not shown in FIG. 3A) of the switch fabric 300 that includes the port hg0. The multicast data unit includes the VLAN identifier 10 of the VLAN 315 and an identifier of the edge device TOR1. In other embodiments, the identifier of the edge device can be inferred based on the port hg0-hg6 at which the ingress stage switch receives the multicast data unit. In such embodiments, the multicast data unit need not include an identifier of the source edge device. For example, the edge device TOR1 can send a multicast data unit, via the port hg0, to an ingress stage switch. The ingress stage switch can determine that the multicast data unit was sent from edge device TOR1 based on the ingress stage switch receiving the data unit via the port 40.

In some embodiments, each ingress stage switch/egress stage switch of the switch fabric 300 can be configured to store and use a VLAN flood table, which maps each VLAN identifier to port(s) connected to device(s) of the VLAN(s) that has that VLAN identifier. FIG. 3B is a schematic illustration of such a VLAN flood table 320 used in the switch fabric 300 in FIG. 3A, according to an embodiment. Specifically, the VLAN flood table 320 can be stored and used at each switch within the switch fabric 300 that can potentially receive multicast data from a coupled edge device (e.g., the edge devices TOR1-TOR7).

As shown in FIG. 3B, the VLAN flood table 320 has two columns of entries, shown as VLAN ID (in column 322) and port ID (in column 324). The first column of the VLAN flood table 320, column 322, contains VLAN identifiers (e.g., 10, 20, etc.), each of which is a VLAN identifier of one or more VLANs operatively coupled to the switch fabric 300. For example, the VLAN identifier 10 stored in the first entry of the VLAN flood table 320 is the VLAN identifier of the VLAN 315 and the VLAN 335, and the VLAN identifier 20 stored in the second entry of the VLAN flood table 320 is the VLAN identifier of the VLAN 355. The second column of the VLAN flood table 320, column 324, contains port identifiers (e.g., hg0-hg6) for ports of the switch fabric 300 that are operatively coupled to a VLAN having the corresponding VLAN identifier in the same entry (i.e., the same row in the VLAN flood table 320). For example, the first entry of the VLAN flood table 320 includes port identifiers of the ports that are operatively coupled to a VLAN having the VLAN identifier 10, which are the ports hg0, hg1 (connected to the VLAN 315), and the ports hg2, hg3 (connected to the VLAN 335). For another example, the second entry of the VLAN flood table 320 includes port identifiers of the ports that are operatively coupled to a VLAN having the VLAN identifier 20, which are the ports hg4, hg5 and hg6 (connected to the VLAN 355).

In response to receiving a multicast data unit from a connected edge device, an ingress stage switch of the switch fabric 300 can determine, based on the VLAN flood table (e.g., the VLAN flood table 320), a set of potential destination ports to which the multicast data unit can be forwarded. Specifically, the ingress stage switch can identify an entry in the VLAN flood table that contains the VLAN identifier of the source edge device, which is included in the received multicast data unit. Based on the identified entry, ports that are operatively coupled to a VLAN having the VLAN identifier can be determined. Additionally, in some embodiments, the port connected to the source edge device can be removed from the set of potential destination ports such that the multicast data unit will not be sent back to the source edge device.

In the example of FIGS. 3A and 3B, in response to receiving the multicast data unit from the edge device TOR1 via the port hg0, the ingress stage switch can identify the first entry of the VLAN flood table 320 based on the VLAN identifier 10 included in the multicast data unit. The ingress stage switch can then determine, based on the first entry of the VLAN flood table 320, that each of the ports hg0-hg3 is operatively coupled to a VLAN having a VLAN identifier 10. After removing the port hg0 that is connected to the edge device TOR1 from a set of potential destination ports, the ingress stage switch determines the set of potential destination ports includes the ports hg1-hg3.

After determining the set of potential destination ports, the ingress stage switch can define multiple instances of the received multicast data unit, and then send an instance of the multicast data unit to each corresponding egress stage switch (e.g., port module) where the potential destination port(s) is located. In some embodiments, similar to the method shown and described with respect to FIG. 2, the instances of the multicast data unit can be transmitted from the ingress stage switch to the egress stage switches via the intermediate stage switches, in a multi-stage switch environment. In some embodiments, each instance of the multicast data unit is an unmodified copy of the original multicast data unit. Particularly, the VLAN identifier included in the original multicast data unit (e.g., in a header of the multicast data unit) is unmodified in each instance of the multicast data unit. In the example of FIGS. 3A-3B, the ingress stage switch defines unmodified instance(s) of the multicast data unit received from the edge device TOR1, and sends the unmodified instance(s) of the multicast data unit to the switch(es) where the ports hg1-hg3 are located.

In some embodiments, each egress stage switch/ingress stage switch of the switch fabric 300 can be configured to store and use a filter table, which maps each edge device operatively coupled to the switch fabric 300 and included in a VLAN domain to port(s) operatively coupled to that VLAN domain. FIG. 3C is a schematic illustration of such a filter table 340 used in the switch fabric 300 in FIG. 3A, according to an embodiment. Specifically, the filter table 340 can be stored and used at each switch within the switch fabric 300 that can potentially send multicast data to a coupled edge device (e.g., the edge devices TOR1-TOR7).

As shown in FIG. 3C, the filter table 340 has three columns of entries, shown as edge device ID (in column 342), domain ID (in column 344), and port ID (in column 346). The first column of the filter table 340, column 342, contains identifiers of edge devices (e.g., TOR1-TOR7), each of which uniquely identifies an edge device operatively coupled to the switch fabric 300. The second column of the filter table 340, column 344, contains identifiers of VLAN domains (e.g., 310, 330, 350), each of which uniquely identifies a VLAN domain that includes the corresponding edge device identified in the first column of the same entry.

The third column of the filter table 340, column 346, contains port identifiers (e.g., hg0-hg6) for ports of the switch fabric 300 that are connected to the VLAN domain identified in the second column of the same entry. For example, the first entry of the filter table 340 stores information of the edge device TOR1, the VLAN domain 310 that includes the edge device TOR1, and the ports hg0, hg1 that are operatively coupled to the VLAN domain 310. For another example, the fifth entry of the filter table 340 stores information of the edge device TOR5, the VLAN domain 350 that includes the edge device TOR5, and the ports hg4-hg6 that are operatively coupled to the VLAN domain 350.

In response to receiving an instance of the multicast data unit destined to one of its ports, an egress stage switch of the switch fabric 300 can be configured to determine, based on the filter table (e.g., the filter table 340), whether to send the instance of the multicast data unit out via that port. Specifically, the egress stage switch can be configured to identify an entry in the filter table that contains the identifier of the source edge device, which is included in the received instance of the multicast data unit. Based on the identified entry, a set of ports that are operatively coupled to the VLAN domain that includes the source edge device can be determined. If the destined port of the egress stage switch is included in the set of ports, the destined port is connected to the same VLAN domain of the source edge device. Thus, the egress stage switch can be configured to send the instance of the multicast data unit out from that destined port. Otherwise, if the destined port of the egress stage switch is not included in the set of ports, the destined port is not connected to the same VLAN domain of the source edge device. As a result, the egress stage switch does not send the instance of the multicast data unit out from the destined port. Furthermore, in some embodiments, the egress stage switch can be configured to drop the data unit.

In the example of FIGS. 3A-3C, in response to receiving an instance of the multicast data unit destined to the port hg1, an egress stage switch of the switch fabric 300 where the port hg1 is located identifies the first entry of the filter table 340 based on the identifier of the source edge device TOR1 included in the received instance of the multicast data unit. The egress stage switch then determines, based on the first entry of the filter table 340, that the destined port hg1 is connected to the same VLAN domain (that is, the VLAN domain 310) of the source edge device TOR1. As a result, the egress stage switch sends the instance of the multicast data unit to the edge device TOR2 via the port hg1.

Similarly, in response to receiving an instance of the multicast data unit destined to the port hg2, an egress stage switch of the switch fabric 300 where the port hg2 is located identifies the first entry of the filter table 340 based on the identifier of the source edge device TOR1 included in the received instance of the multicast data unit. The egress stage switch then determines, based on the first entry of the filter table 340, that the destined port hg2 is not connected to the same VLAN domain (that is, the VLAN domain 310) of the source edge device TOR1. As a result, the egress stage switch drops the instance of the multicast data unit such that it is not sent to the TOR3 via the port hg2.

As such, the switch fabric 300 can forward multicast data received from an edge device within a VLAN of a VLAN domain to each other edge device within the same VLAN of the same VLAN domain by using the VLAN flood table at each ingress stage switch and using the filter table at each egress stage switch. In some embodiments, the VLAN flood table and/or the filter table can be implemented at any stage of a multi-stage switch fabric. For example, the VLAN flood table and the filter table can be implemented together at the ingress stage (e.g., the first stage 240 of the switch fabric 200 in FIG. 2). For another example, the VLAN flood table can be implemented at the ingress stage and the filter table can be implemented at a second stage immediately after the ingress stage (e.g., the second stage 242 of the switch fabric 200 in FIG. 2).

In some embodiments, the filter table can be used before the VLAN flood table is used to perform the multicast data switching function for an incoming multicast data unit. The two tables can be implemented in the same stage or different stages of the multi-stage switch fabric. In such embodiments, a first set of ports that are connected to the same VLAN domain of the source edge device can be first selected, and then a second set of ports that are connected to a VLAN having the same VLAN identifier as that included in the multicast data unit can be further determined from the first set of ports. The second set of ports, as the result of the process, will be the same as the result of the process described above, where the VLAN flood table is used before the filter table is used.

In some embodiments, the port connected to the source edge device can be collocated with one or more destination ports at the same switch. In such embodiments, after receiving a multicast data unit and then determining an appropriate destination port, which is a port of the switch, the switch can be configured to send out an instance of the multicast data unit via the destination port without passing the instance of the multicast data unit through any other switch. For example, the ports hg0 and hg1 can be collocated at the same switch within the switch fabric 300. After receiving a multicast data unit from the edge device TOR1 via the port hg0 and then determining that hg1 is an appropriate destination port for the received multicast data unit, the switch can be configured to send an instance of the multicast data unit to the edge device TOR2 via the port hg1 without passing the instance of the multicast data unit through any other switch of the switch fabric 300.

Figure 4A:
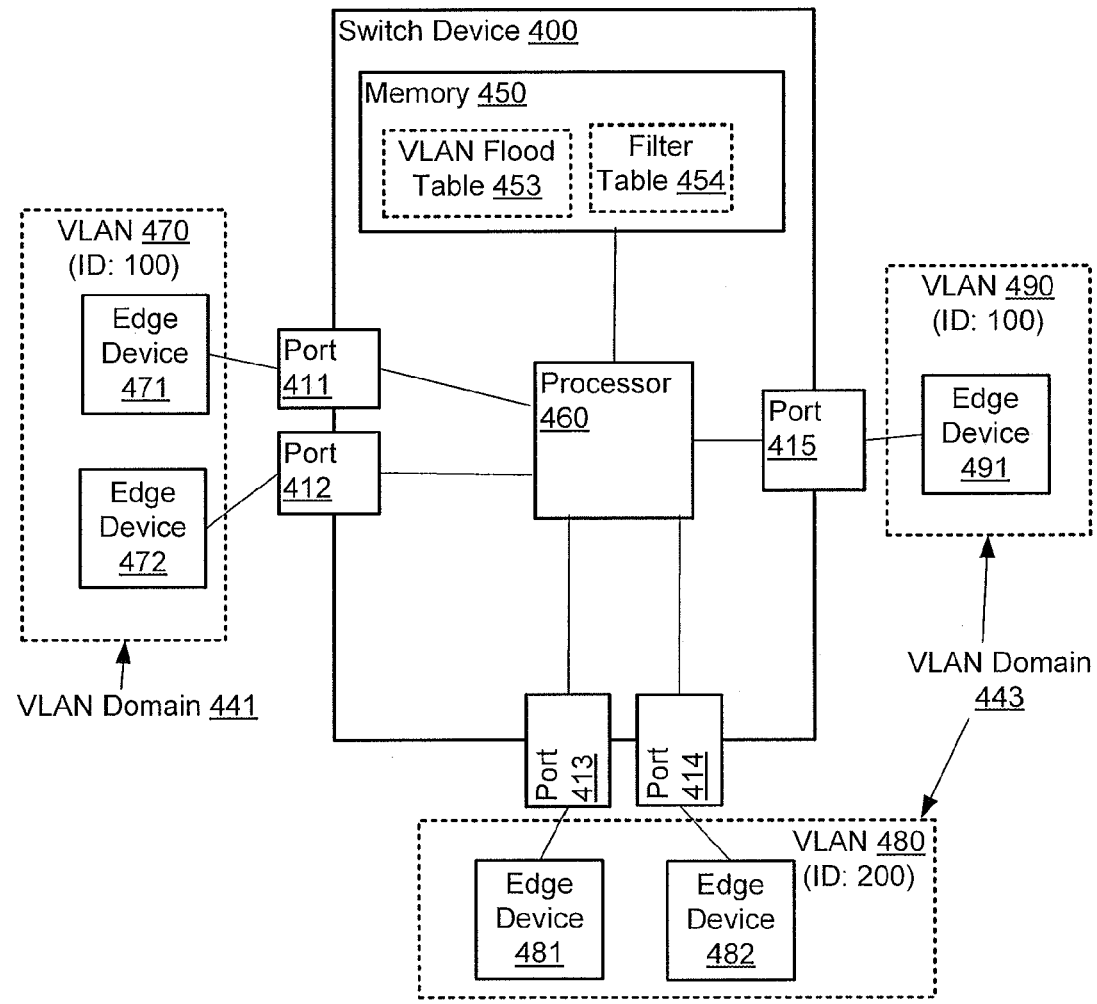
FIG. 4A is a schematic illustration of a switch device configured to forward data for multiple VLANs associated with multiple VLAN domains, according to an embodiment.

FIG. 4A is a schematic illustration of a switch device 400 configured to forward data for multiple VLANs (e.g., VLANs 470, 480, 490) associated with multiple VLAN domains (VLAN domains 441, 443), according to an embodiment. The switch device 400 can be any device that can be configured to perform a switching function similar to the switching function performed by the switch fabrics 110, 200 and 300, as shown and described with respect to FIGS. 1-3C. Particularly, similar to the switch fabrics 110, 200 and 300, the switch device 400 can be configured to switch multicast data for devices of multiple VLANs associated with multiple VLAN domains.

As shown in FIG. 4A, the switch device 400 includes a memory 450, which includes a VLAN flood table 453 and a filter table 454; a processor 460; and ports 411-415. The switch device 400 is operatively coupled to an edge device 471 via the port 411, an edge device 472 via the port 412, an edge device 481 via the port 413, an edge device 482 via the port 414, and an edge device 491 via the port 415. The processor 460 is operatively coupled to the memory 450 and the ports 411-415.

The edge devices connected to the switch device 400 can be structurally and functionally similar to the edge devices 181-183 and the edge devices TOR1-TOR7 shown and described with respect to FIG. 1 and FIG. 3A. Furthermore, the edge devices 471 and 472 are included in a VLAN 470 having a VLAN identifier 100 and associated with a VLAN domain 441; the edge devices 481 and 482 are included in a VLAN 480 having a VLAN identifier 200 and associated with a VLAN domain 443; and the edge devices 491 is included in a VLAN 490 having a VLAN identifier 100 (identical to the VLAN identifier for the VLAN 470) and associated with the VLAN domain 443.

The VLANs 470, 480, 490 and the associated VLAN domains 441, 443 are similar to the VLANs 315, 335, 355 and VLAN domains 310, 330, 350 shown and described with respect to FIG. 3A, respectively. Particularly, each VLAN has an identifier that is unique within its associated VLAN domain, but not necessarily unique across VLAN domains. Furthermore, more than one VLAN can be associated with a common VLAN domain, such as the VLAN 480 and 490 being associated with the VLAN domain 443. In some embodiments, the switch device 400 can be operatively coupled to more or less VLANs that are associated with more or less VLAN domains than those shown in FIG. 4A.

The ports 411-415 can be any entity or component that can actively communicate with a coupled device (e.g., an edge device) or over a network. The ports 411-415 can be structurally and functionally similar to the ports hg0-hg6 of the switch fabric 300 shown and described with respect to FIG. 3A. Each port 411-415 can function as an ingress port and/or an egress port. That is, data can be received at and/or sent out from each port 411-415. In some embodiments, a port 411-415 needs not necessarily be a hardware port, but can be a virtual port or a port defined by software. Although not shown in FIG. 4A, in some embodiments, the switch device 400 can have more or less ports connected to more or less edge devices.

The processor 460 can be any processing device or component configured to perform the multicast data switching function for the switch device 400. In some embodiments, although not shown in FIG. 4A, the processor 460 can include one or more modules configured to perform different functions associated with the multicast data switching. In such embodiments, the module(s) included in the processor 460 can be a hardware-based module (e.g., an ASIC, a DSP, a FPGA), a software-based module (e.g., a module of computer code executed at a processor, a set of processor-readable instructions executed at a processor), and/or a combination of hardware- and software-based modules. In some embodiments, the module(s) included in the processor 460 can be, for example, a process, application, virtual machine, and/or some other software module (stored in memory and/or executing in hardware) or a hardware module configured to manage one or more edge devices (e.g., the edge devices 471, 472, 481, 482, 491), ports (e.g., ports 411-415) and other components of the switch device 400, and/or other devices.

In some embodiments, the memory 450 can be, for example, a random-access memory (RAM) (e.g., a dynamic RAM, a static RAM), a flash memory, a removable memory, and/or so forth. In some embodiments, instructions that implement the VLAN flood table 453 and the filter table 454 can be stored within the memory 450 and executed at the processor 460. In some embodiments, the VLAN flood table 453 and/or the filter table 454 can be implemented as, for example, a relational database, a table, and/or so forth. In some embodiments, the VLAN flood table 453 and the filter table 454 can each be stored in one or more locations within the memory 450.

FIG. 4B is a schematic illustration of the VLAN flood table 453 used in the switch device 400 in FIG. 4A, according to an embodiment. As shown in FIG. 4B, the VLAN flood table 453 has three columns of entries, shown as VLAN ID (in column 41), port 1D (in column 42), and port bitmap (in column 43). The first and second columns of the VLAN flood table 453 are similar to the two columns of the VLAN flood table 320 shown and described with respect to FIG. 3B. Specifically, the first column of the VLAN flood table 453, column 41, contains VLAN identifiers (e.g., 100, 200), each of which is a VLAN identifier of one or more VLANs operatively coupled to the switch device 400. The second column of the VLAN flood table 453, column 42, contains port identifiers (e.g., 411-415) for ports of the switch device 400 that are connected to a VLAN having the corresponding VLAN identifier in the same entry (i.e., the same row in the VLAN flood table 453). The third column of the VLAN flood table 453, column 43, contains port bitmaps (e.g., 11001, 00110), each of which is a bitmap corresponding to the ports identified in the second column of the same entry. Specifically, the five bits in the port bitmap correspond to the five ports 411-415 of the switch device 400, in that order. Thus, a bit of "1" in a position of the port bitmap indicates that the corresponding port at the same position is identified; and similarly, a bit of "0" in a position of the port bitmap indicates that the corresponding port at the same position is not identified.

For example, the first entry of the VLAN flood table 453 includes port identifiers of the ports that are connected to a VLAN having the VLAN identifier 100, which are the ports 411, 412 (connected to the VLAN 470), and the port 415 (connected to the VLAN 490); and a port bitmap "11001" identifying the ports 411, 412 and 415 from the list of ports 411-415. For another example, the second entry of the VLAN flood table 453 includes port identifiers of the ports that are connected to a VLAN having the VLAN identifier 200, which are the ports 413 and 414 (connected to the VLAN 480); and a port bitmap "00110" identifying the ports 413 and 414 from the list of ports 411-415.

FIG. 4C is a schematic illustration of the filter table 454 used in the switch device 400 in FIG. 4A, according to an embodiment. The filter table 340 has four columns of entries, shown as edge device ID (in column 44), domain 1D (in column 45), port ID (in column 46), and port bitmap (in column 47). The first column of the filter table 454, column 44, contains a set of edge device identifiers (e.g., 471, 472, 481, 482, 491), which uniquely identify a set of edge devices that are coupled to the switch device 400 and included in a VLAN domain that is identified by a VLAN domain identifier (e.g., 441, 443) included in the second column of the same entry, column 45. The third column of the filter table 454, column 46, contains port identifiers (e.g., 411-415) for ports of the switch device 400 that are connected to the VLAN domain identified in the second column of the same entry. The fourth column of the filter table 454, column 47, contains port bitmaps (e.g., 11000, 00111), each of which is a bitmap corresponding to the ports identified in the third column of the same entry. The port bitmaps stored in the column 47 of the filter table 454 are similar to the port bitmaps stored in the column 43 of the VLAN flood table 453. Specifically, the five bits in the port bitmap correspond to the five ports 411-415 of the switch device 400, in that order. Thus, a bit of "1" in a position of the port bitmap indicates that the corresponding port at the same position is identified; similarly, a bit of "0" in a position of the port bitmap indicates that the corresponding port at the same position is not identified. Note that the order of the ports used in defining a port bitmap for the filter table 454 is the same as that used in defining a port bitmap for the VLAN flood table 453. Similarly stated, in the example of FIGS. 4A-4C, port bitmaps are defined based on the same order for the ports of the switch device 400 (i.e., ports 411, 412, 413, 414, 415), for both the VLAN flood table 453 and the filter table 454.

For example, the first entry of the filter table 454 stores information of the edge devices 471 and 472 that are included in the VLAN domain 441; the ports 411 and 412 that are coupled to the VLAN domain 441; and a port bitmap "11000" identifying the ports 411 and 412 from the list of ports 411-415. For another example, the second entry of the filter table 454 stores information of the edge devices 481, 482 and 491 that are included in the VLAN domain 443; the ports 413, 414 and 415 that are coupled to the VLAN domain 443; and a port bitmap "00111" identifying the ports 413, 414 and 415 from the list of ports 411-415.

Based on the VLAN flood table 453 and the filter table 454, the switch device 400 can be configured to switch multicast data units for the coupled edge devices in a similar method to the switch fabric 300 as described with respect to FIGS. 3A-3C. Specifically, the switch device 400 can be configured to receive a multicast data unit from a source edge device via a port of the switch device 400 that is connected to that source edge device. The multicast data unit includes an identifier of the source edge device, and a VLAN identifier of the VLAN that includes the source edge device. The VLAN is included in a VLAN domain. The multicast data unit is intended to be delivered to each other edge device within the same VLAN and the same VLAN domain. In the example of FIGS. 4A-4C, the switch device 400 can receive a multicast data unit from the edge device 471 via the port 411, which is included in the VLAN 470 of the VLAN domain 441.

Based on the VLAN identifier included in the received multicast data unit, the processor 460 can identify an entry of the VLAN flood table 453 that includes that VLAN identifier. The processor 460 can then retrieve, from the column 43 of the identified entry, a port bitmap associated with that VLAN identifier. Similarly, based on the identifier of the source edge device included in the received multicast data unit, the processor 460 can identify an entry of the filter table 454 that includes that source edge device identifier. The processor 460 can then retrieve, from the column 47 of the identified entry, a port bitmap associated with that source edge device identifier. Next, the processor 460 can determine a set of potential destination ports by performing a bitwise AND operation on the two retrieved port bitmaps (the port bitmap associated with the VLAN identifier retrieved from the VLAN flood table 453 and the port bitmap associated with the source edge device identifier retrieved from the filter table 454). As a result, each bit of "1" from the outcome of the bitwise AND operation indicates that the corresponding port is a potential destination port. Furthermore, the port connected to the source edge device can be removed from the set of potential destination ports, and the remaining ports from the set of potential destination ports are the appropriate destination ports.

Similar to the ingress stage switches of the switch fabric 300 described with respect to FIG. 3A, the switch device 400 can define instances of the multicast data unit (e.g., unmodified copies of the multicast data unit) based on the multicast data unit. The switch device 400 can send an instance of the multicast data unit from each appropriate destination port. Thus, the process of forwarding the multicast data unit is completed at the switch device 400.

Following this example of FIGS. 4A-4C, based on the VLAN identifier 100 included in the received multicast data unit, the processor 460 can identify the first entry of the VLAN flood table 453. The processor 460 can then retrieve, from the column 43 of the first entry of the VLAN flood table 453, the port bitmap 11001 that is associated with the VLAN identifier 100. Similarly, based on the edge device identifier 471 included in the received multicast data unit, the processor 460 can identify the first entry of the filter table 454. The processor 460 can then retrieve, from the column 47 of the first entry of the filter table 454, the port bitmap 11000 that is associated with the edge device identifier 471. Next, the processor 460 can generate a port bitmap 11000 by performing a bitwise AND operation on the two port bitmaps, 11001 and 11000. Thus, the ports 411 and 412 can be determined as potential destination ports based on the generated port bitmap 11000. After removing the port 411 that is connected to the source edge device 471, the port 412 is determined as the appropriate destination port. Thus, the switch device 400 can define and send an unmodified copy of the received multicast data unit to the edge device 472 via the port 412. As such, the process of forwarding the multicast data unit is completed at the switch device 400.

FIG. 5 is a flow chart that illustrates a method 500 for forwarding data among edge devices associated with a common VLAN domain, according to an embodiment. The code representing instructions to perform the method 500 can be stored in, for example, a non-transitory processor-readable medium (e.g., a memory) in a switch device of a switch fabric (e.g., a multi-stage switch fabric), which is similar to the egress stage switch (e.g., an egress stage switch, a port module) of the switch fabric 300 shown and described with respect to FIGS. 3A-3C. The code can be executed by, for example, a processor of the switch device. The code stored in the non-transitory processor-readable medium includes code to be executed by the processor to cause the switch device to operate the functions illustrated in FIG. 5 and described as follows.

At 502, a first instance of a multicast data unit can be received from a switch module of the switch fabric at the switch device. The first instance of the multicast data unit can be defined based on a second instance of the multicast data unit, which is received at the switch module from a first edge device associated with a VLAN identifier. The first instance of the multicast data unit can include an identifier of the first edge device, which uniquely identifies the first edge device and differentiates the first edge device from other edge devices operatively coupled to the switch fabric. In some embodiments, the first instance of the multicast data unit can be an unmodified copy of the second instance of the multicast data unit. Particularly, the VLAN identifier is included in the first and second instances of the multicast data units in the same format (e.g., using the same number of bits in a header of the first and second instances of the multicast data units).

In some embodiments, the switch device can be determined, as a destination to which to send the first instance of the multicast data unit, by the switch module based on a VLAN flood table implemented at the switch module. Such a VLAN flood table can be similar to the VLAN flood table 320 shown and described with respect to FIG. 3B. Specifically, a port of the switch device can be selected as a destination port using the VLAN identifier included in the second instance of the multicast data unit, similar to the method described with respect to FIGS. 3A-3C. The switch module can then be configured to send the first instance of the multicast data unit to the switch device that includes the selected destination port.

At 504, a filter rule can be selected from a filter database at the switch device, based on the identifier of the first edge device included in the first instance of the multicast data unit. The filter database can be similar to the filter database 340 shown and described with respect to FIG. 3B, and the filter rule can be associated with an entry of the filter database. The selected filter rule associates the identifier of the first edge device with a set of ports of the switch fabric associated with a VLAN domain of the first edge device. In some embodiments, the set of ports can be determined based on a VLAN flood table and/or the like. In some embodiments, as described with respect to FIGS. 3A-3C, the filter rule (e.g., an entry of the filter database) that includes the identifier of the first edge device can be selected.

In some embodiments, the VLAN domain is different than the VLAN of the first edge device in the sense that the VLAN domain has a unique identifier that differentiates the VLAN domain from other VLAN domains, while the VLAN identifier for the VLAN of the first edge device can be the same as a VLAN identifier for another VLAN included in a different VLAN domain. Furthermore, the VLAN domain can include one or more other VLANs different than the VLAN of the first edge device.

At 506, the first instance of the multicast data unit can be sent from the switch device to a second edge device associated with the VLAN identifier if, according to the filter rule, the second edge device is operatively coupled to the switch module (e.g., via the switch device and/or other switches in the switch fabric) via a port from the set of ports. Specifically, if the port is included in the set of ports associated with the first edge device according to the filter rule, the second edge device, which is operatively coupled to the switch fabric via the port, is included in the VLAN domain associated with the first edge device. Otherwise, if the port is not included in the set of ports associated with the first edge device according to the filter rule, the second edge device is not included in the VLAN domain associated with the first edge device. As a result, the switch device can drop the first instance of the multicast data unit.

As described with respect to FIGS. 3A-3C, the fact that the port of the switch device is selected at the switch module as a destination port to receive an instance of the multicast data unit indicates that the second edge device, which is operatively coupled to the switch fabric via the port, is included in a VLAN having the same VLAN identifier as that for the first edge device. Similarly stated, the second edge device is included in the same VLAN that includes the first edge device, in the same VLAN domain. Thus, the second edge device is an appropriate destination to receive an instance of the multicast data unit.

While examples of VLAN flood tables and filter tables being shown and described above with respect to FIGS. 3B, 3C, 4B and 4C, in other embodiments, a VLAN flood table and/or a filter table can be implemented in any other suitable format in a switch device (e.g., a standalone switch device similar to the switch device 400 in FIG. 4A, an ingress stage switch/egress stage switch in a multi-stage switch fabric similar to the switch fabric 300 in FIG. 3A). For example, the entries in the filter table 340 can be grouped based on the domain identifier, such that each unique domain identifier is associated with a single entry in the table similar to the filter table 454 in FIG. 4C. For another example, columns for domain identifiers (e.g., the column 344 in the filter table 340, the column 45 in the filter table 454) and/or columns for ports (e.g., the column 42 in the VLAN flood table 453, the column 46 in the filter table 454) in some of the tables can be removed without affecting the multicast data switching performed using those tables.

While shown and described above with respect to FIGS. 3B, 3C, 4B and 4C as the VLAN flood table and the filter table being implemented as two separate tables to accomplish different functions associated with multicast data switching, in other embodiments, a single table as a combination of the two tables can be implemented to accomplish the multicast data switching. For example, the VLAN flood table 320 and the filter table 340 can be combined to form a single table consisting of columns for VLAN identifiers, edge device identifiers, and associated port identifiers. Such a single table can be implemented at each ingress stage switch of the switch fabric 300 in FIG. 3A. Similarly, for another example, the VLAN flood table 453 and the filter table 454 can be combined to form a single table consisting of columns for VLAN identifiers, edge device identifiers, and associated port bitmaps. Such a single table can be implemented at the switch device 400 in FIG. 4A.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components, and/or features of the different embodiments described.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
a switch module implemented in at least one of a memory or a processing device, the switch module configured to:
receive, from a first edge device operatively coupled to the switch module, a multicast data unit having a virtual local area network (VLAN) identifier,
select, based on the VLAN identifier, a set of egress stage switches associated with the VLAN identifier from a flood table stored at the switch module and containing a mapping of the VLAN identifier to a set of ports collectively associated with the VLAN identifier and the set of egress stage switches,
remove an egress stage switch corresponding to the first edge device from the selected set of egress stage switches to produce a modified set of egress stage switches,
define an unmodified instance of the multicast data unit for each egress stage switch from the modified set of egress stage switches associated with the retrieved identifiers, and
send the unmodified instance of the multicast data unit to each associated egress stage switch from the modified set of egress stage switches such that each egress stage switch from the modified set of egress stage switches applies a filter, based on a filter table, to the unmodified instance of the multicast data unit received at that egress stage switch from the modified set of egress stage switches to restrict that unmodified instance of the multicast data unit from being sent to a second edge device operatively coupled to the switch module via that egress stage switch from the modified set of egress stage switches if the second edge device is associated with a VLAN domain different than a VLAN domain of the first edge device, the filter table containing a mapping of each edge device of a plurality of edge devices to a VLAN domain of that edge device and a set of ports collectively associated with the VLAN domain of that edge device, the plurality of edge devices including the first edge device and the second edge device.

2. The apparatus of claim 1, wherein the multicast data unit includes an identifier of the first edge device, the switch module configured to send the unmodified instance of the multicast data unit to each egress stage switch from the modified set of egress stage switches associated with the VLAN identifier such that each egress stage switch from the modified set of egress stage switches applies the filter based on the identifier of the first edge device within the instance of the multicast data unit received at that egress stage switch from the modified set of egress stage switches.

3. The apparatus of claim 1, wherein the switch module is implemented at an ingress stage of a multistage switch, the switch module configured to send the unmodified instance of the multicast data unit to each egress stage switch from the modified set of egress stage switches at an egress stage of the multistage switch.

4. The apparatus of claim 1, wherein the switch module is physically collocated with each egress stage switch from the set of egress stage switches.

5. The apparatus of claim 1, wherein the switch module is implemented at a first device, at least one egress stage switch from the set of egress stage switches being implemented at a second device different from the first device.

6. The apparatus of claim 1, wherein each egress stage switch from the modified set of egress stage switches applies a filter to the instance of the multicast data unit received at that egress stage switch by:
retrieving, from a filter table stored at that egress stage switch, a VLAN domain identifier associated with a VLAN domain of the first edge device, using an identifier of the first edge device, and
determining whether an identifier of the second edge device is associated with the VLAN domain identifier of the first edge device in the filter table.

7. The apparatus of claim 1, wherein each egress stage switch of the set of egress stage switches stores a corresponding copy of the flood table.

8. A non-transitory processor-readable medium storing code representing instructions to be executed by a processor, the code comprising code to cause the processor to:
receive, from a switch module, a first instance of a multicast data unit defined based on a second instance of the multicast data unit being received at the switch module and from a first edge device associated with a virtual local area network (VLAN) identifier, the first instance of the multicast data unit including an identifier of the first edge device and the VLAN identifier;
retrieve, based on the identifier of the first edge device and from a filter table, a VLAN domain identifier associated with a VLAN domain of the first edge device, the VLAN domain of the first edge device including a VLAN associated with the first edge device, the filter table containing a mapping of each edge device of a plurality of edge devices to a VLAN domain identifier of that edge device and a set of ports collectively associated with that VLAN domain identifier, the plurality of edge devices including the first edge device and the second edge device,
determine whether an identifier of a second edge device is associated with the VLAN domain identifier of the first edge device in the filter table, and
send the first instance of the multicast data unit to the second edge device associated with the VLAN identifier if the second edge device identifier is associated with the VLAN domain identifier of the first edge device in the filter table.

9. The non-transitory processor-readable medium of claim 8, wherein the first instance of the multicast data unit is an unmodified copy of the second instance of the multicast data unit.

10. The non-transitory processor-readable medium of claim 8, wherein the first instance of the multicast data unit includes the VLAN identifier.

11. The non-transitory processor-readable medium of claim 8, the code further comprising code to cause the processor to:
drop the first instance of the multicast data unit if the second edge device is not associated with the VLAN domain identifier of the first edge device.

12. The non-transitory processor-readable medium of claim 8, wherein the code to cause the processor to receive includes code to cause the processor to receive the first instance of the multicast data unit at a port module based on the second edge device being operatively coupled to the switch module via the port module.

13. The non-transitory processor-readable medium of claim 8, wherein the code to cause the processor to receive includes code to cause the processor to receive, from the switch module at an ingress stage of a multistage switch fabric, the first instance of the multicast data unit at an egress stage of the multistage switch fabric.

14. The non-transitory processor-readable medium of claim 8, wherein the VLAN identifier is associated with a set of edge devices including the first edge device, the VLAN domain of the first edge device includes a subset of the set of edge devices.

15. An apparatus, comprising:
a port module implemented in at least one of a memory or a processing device, the port module configured to receive, from a switch module and based on a first edge device operatively coupled to the switch module via the port module being associated with a virtual local area network (VLAN) identifier, a first instance of a multicast data unit defined based on a second instance of the multicast data unit (1) received at the switch module from a second edge device, and (2) having an identifier of the second edge device,
the port module configured to retrieve, from a filter database at the port module, a VLAN domain identifier associated with a VLAN domain associated with the second edge device, using the identifier of the second edge device in the first instance of the multicast data unit, the filter database containing a mapping of each edge device of a plurality of edge devices to a VLAN domain identifier of that edge device and a set of ports collectively associated with the VLAN domain identifier of that edge device, the plurality of edge devices including the first edge device and the second edge device,
the port module configured to determine whether the identifier of the first edge device is associated with the VLAN domain identifier of the second edge device in the filter database, and
the port module configured to send the first instance of the multicast data unit to the first edge device if the first edge device is associated with the VLAN domain associated with the second edge device.

16. The apparatus of claim 15, wherein the first instance of the multicast data unit is an unmodified copy of the second instance of the multicast data unit received at the switch module from the second edge device.

17. The apparatus of claim 15, wherein:
the port module determines a filter result using a bitwise logical AND of a port bitmap associated with the VLAN identifier and a bitmap associated with the VLAN domain of the second edge device.

18. The apparatus of claim 15, wherein the port module is implemented at a first device different than a second device implementing the switch module.

19. The apparatus of claim 15, wherein the port module is configured to receive the first instance of the multicast data unit from the switch module based on an identifier of the first edge device being associated with the VLAN identifier in a VLAN flood table.

20. The apparatus of claim 15, wherein the filter database associates the identifier of the second edge device with a set of ports associated with the VLAN domain of the second edge device.

21. The apparatus of claim 15, wherein the port module is implemented at an egress stage of a multistage switch fabric.

22. The apparatus of claim 15, wherein the VLAN identifier is associated with a set of edge devices including the first edge device and the second edge device, the VLAN domain of the second edge device includes a subset of the set of edge devices.

23. The apparatus of claim 15, wherein the VLAN domain of the second edge device includes a plurality of VLANs including a VLAN associated with the VLAN identifier.

* * * * *